United States Patent
Chandrane et al.

(10) Patent No.: US 10,873,865 B2
(45) Date of Patent: Dec. 22, 2020

(54) METHODS AND SYSTEMS FOR PROVIDING CALL CONTINUITY IN A USER EQUIPMENT (UE)

(71) Applicant: SAMSUNG ELECTRONICS CO., LTD., Suwon-si (KR)

(72) Inventors: Sathia Chandrane, Bangalore (IN); Deepak R, Bangalore (IN); Bharat Vinayak Bhat, Bangalore (IN); Nitin Jain, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 189 days.

(21) Appl. No.: 15/875,105

(22) Filed: Jan. 19, 2018

(65) Prior Publication Data

US 2018/0279140 A1 Sep. 27, 2018

(30) Foreign Application Priority Data

Mar. 27, 2017 (IN) .............................. 201741010826

(51) Int. Cl.
| | |
|---|---|
| *H04W 4/00* | (2018.01) |
| *H04W 24/04* | (2009.01) |
| *H04W 36/24* | (2009.01) |
| *H04W 84/04* | (2009.01) |
| *H04W 36/08* | (2009.01) |
| *H04W 76/19* | (2018.01) |

(52) U.S. Cl.
CPC ........... *H04W 24/04* (2013.01); *H04W 36/24* (2013.01); *H04W 36/08* (2013.01); *H04W 76/19* (2018.02); *H04W 84/042* (2013.01)

(58) Field of Classification Search
CPC .... H04W 24/04; H04W 36/08; H04W 84/042
See application file for complete search history.

(56) References Cited

U.S. PATENT DOCUMENTS

| | | | | |
|---|---|---|---|---|
| 8,265,618 B2* | 9/2012 | MacNaughtan | ...... | H04W 24/02 455/422.1 |
| 8,588,057 B2 | 11/2013 | Dimou et al. | | |
| 9,549,348 B2* | 1/2017 | Olsson | .................. | H04W 36/14 |
| 2001/0019345 A1* | 9/2001 | Endo | .......................... | B41J 2/15 347/43 |
| 2002/0086682 A1* | 7/2002 | Naghian | .................... | G01S 5/06 455/456.1 |
| 2002/0123348 A1* | 9/2002 | Willars | ................. | H04W 48/02 455/436 |
| 2011/0080825 A1* | 4/2011 | Dimou | ................. | H04J 11/0086 370/216 |
| 2011/0188451 A1* | 8/2011 | Song | ................. | H04W 36/0033 370/328 |
| 2011/0281570 A1* | 11/2011 | Shi | ........................ | H04W 24/10 455/418 |

(Continued)

FOREIGN PATENT DOCUMENTS

| | | |
|---|---|---|
| CN | 101184323 A | 5/2008 |
| WO | 2014/165346 A1 | 10/2014 |
| WO | 2015/047567 A1 | 4/2015 |

*Primary Examiner* — Minh Trang T Nguyen
(74) *Attorney, Agent, or Firm* — Sughrue Mion, PLLC

(57) ABSTRACT

Providing call continuity for an ongoing call of a User Equipment (UE) of a wireless communication by defining UE behavior specifying actions to be taken by the UE upon detection of occurrence of an event among a plurality of events that may occur during the ongoing call.

19 Claims, 6 Drawing Sheets

(56) References Cited

U.S. PATENT DOCUMENTS

2013/0260745 A1\* 10/2013 Johansson ............. H04W 24/02
    455/423
2016/0219488 A1\* 7/2016 Han ...................... H04W 24/04

\* cited by examiner

METHODS AND SYSTEMS FOR PROVIDING CALL CONTINUITY IN A USER EQUIPMENT (UE)

CROSS-REFERENCE TO RELATED APPLICATION

This application claims priority under 35 U.S.C. § 119(a) from an Indian Patent Application No. 201741010826, filed on Mar. 27, 2017, in the Indian Intellectual Property Office, the disclosure of which is incorporated herein by reference in its entirety.

BACKGROUND

1. Field

Methods and apparatuses consistent with embodiments of the present application relate to the field of wireless communications and more particularly to providing call continuity in a User Equipment (UE).

2. Description of Related Art

Wireless communication systems provide call service to a mobile device (e.g., user equipment) of a customer or user. An ongoing call may not be limited to only one network operator, call functionality may be provided across multiple networks and network operators when the mobile device of user travels.

For the network operator, providing call consistency by improving call continuity of an ongoing call is critical to provide reliable user experience. The network operators may face challenges on a plurality of fronts in an effort to maintain call continuity and reduce call drop rates.

In a typical scenario, in which signal conditions are suboptimal, for any established circuit-switched (CS) or packet-switched (PS) call, if the Uplink (UL) transmissions are unsuccessful, the UE may not receive acknowledgements from the lower layer. This leads to desynchronization between the UE and network entities of a wireless communication system if the duration to satisfy the radio link control (RLC) unrecoverable error is too long but Downlink (DL) receptions are acceptable until certain duration. On occurrences of such events, to maintain call continuity, the UE (in accordance with current Third Generation partnership Project (3GPP) standards) is configured check whether a Radio Link Failure (RLF) condition is satisfied. On successful detection of the RLF condition, the UE is configured to declare RLF failure. However, in practical situations, it may take considerable time for the UE to detect that the RLF condition is satisfied and a considerable delay may be introduced.

Examples of such scenarios in which delay in RLF related procedures might occur are provided. In a first example, whenever the UE receives a certain number of consecutive out of sync indications, the UE starts a timer, on expiry of which the UE triggers actions related to RLF. However if there are any in-sync indication in-between the out of sync indications, then the delay therebetween is sumed for satisfying the RLF condition. In another example related to a RLC un-recoverable error condition, the UE monitors whether the RLC un-recoverable error condition is satisfied by checking whether a Protocol Data Unit (PDU) retransmission count has reached to its maximum count and no acknowledgement is received for the transmitted protocol data units (PDUs). In such scenario, because new Service Data Units (SDUs) are submitted to a Radio Link Control (RLC) from a Radio Resource Control (RRC) whenever measurement reports are triggered, the RLC retransmits with the latest PDU sequence number. This retransmission adds up to the time before the condition for the RLC un-recoverable error is satisfied causing further delay.

However, delays in declaring the RLF may trigger a radio resource control (RRC) connection release procedure at the network end. However, the UE, in response to the declaration of the RLF, simultaneously may have triggered cell update to re-establish the CS/PS call. Meanwhile, the network may have sent an RRC connection release, resulting in a call drop even though UE had initiated the cell update for maintaining call continuity. This increases the call drop rate, and degrades the user experience.

If the UE does not experience the above mentioned obstacles, then the UE may be successful in declaring the RLF and triggering the cell update to re-establish the CS/PS ongoing call. However, in scenario in which a cell selected for re-establishing the ongoing call belongs to a different Radio Network Controller (RNC) (referred as drift RNC) and not to a serving RNC, there may arise are two possibilities depending on the network deployment. In presence of such possibilities, mentioned here, the chances of call drop are high. One possibility is that the network may not respond to the cell update, then in accordance to current 3GPP standard the UE retries the cell update until the maximum number of attempts is exhausted. If unsuccessful in the attempts, the UE retires, releases the connection locally and switches to idle mode, and thus the ongoing call is dropped. The other possibility is that the network may send RRC connection release with a cause indicating "Directed Signalling Connection Re-establishment (DSCR) ". On receiving the DSDR, the UE immediately moves to idle mode and indicates the cause to the upper layers, and thus the ongoing call is dropped.

Thus, with the UE following the current standards for cell update procedures and in presence of above mentioned scenarios, the call drop rate of the UE increases, degrading the user experience.

SUMMARY

Aspects of embodiments of the present application provide methods and wireless communication systems for providing call continuity of an ongoing call of a User Equipment (UE) of a wireless communication system by defining UE behavior on detection of occurrence of an event during the ongoing call and performing at least one action based on the detected event.

Aspects of embodiments of the present application provide a method for maintaining call continuity when the detected event corresponds to confirmation of time elapsed from a last received acknowledgement message from a serving Radio Network Controller (RNC) exceeds a first predefined time duration.

Aspects of embodiments of the present application provide a method for maintaining call continuity if the detected event corresponds to reception of a Radio Resource Control (RRC) connection release message with a cause as Directed Signaling Connection Re-establishment (DSCR) from a drift RNC.

Aspects of embodiments of the present application provide a method for providing call continuity if the detected event corresponds to confirmation of no reception of response from the drift RNC after the UE carries out maximum allowed cell update attempts for re-establishing the ongoing call.

In view of the foregoing, according to an aspect of an embodiment, there is provided a method for call continuity for an ongoing call of a User Equipment (UE) in a wireless communication system including detecting occurrence of an event during the ongoing call, the event including detecting whether time elapsed from a last received acknowledgement message from a serving Radio Network Controller (RNC) exceeds a first predefined time duration or reception of a Radio Resource Control (RRC) connection release message with a cause as Directed Signaling Connection Re-establishment (DSCR) from a drift RNC or no reception of response from the drift RNC after the UE carries out a maximum quantity of allowed cell update attempts for re-establishing the ongoing call, and performing at least one action based on the detected event.

According to an aspect of an embodiment, there is provided a User Equipment (UE) in a wireless communication system for call continuity for an ongoing call including a call continuity management unit configured to detect occurrence of an event during the ongoing call, the event including detecting whether time elapsed from a last received acknowledgement message from a serving Radio Network Controller (RNC) exceeds a first predefined time duration or reception of a Radio Resource Control (RRC) connection release message with a cause as Directed Signaling Connection Re-establishment (DSCR) from a drift RNC or no reception of response from the drift RNC after the UE carries out a maximum quantity of allowed cell update attempts for re-establishing the ongoing call, and performing at least one action based on the detected event.

The above and other aspects will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following description with reference to the drawings, in which.

DETAILED DESCRIPTION OF EMBODIMENTS

Figure 1:
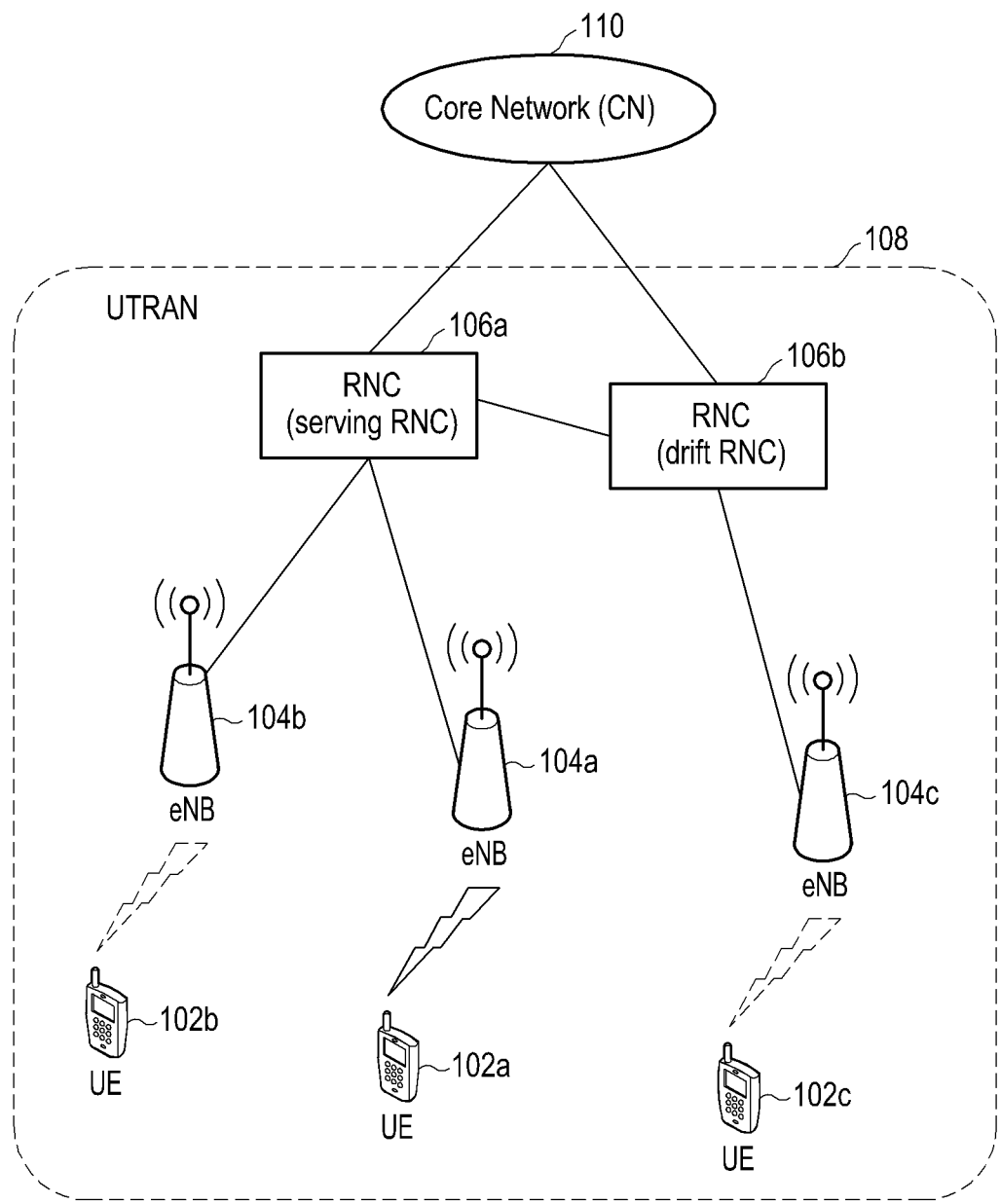
FIG. 1 illustrates a wireless communication system for providing call continuity for an ongoing call of a User Equipment (UE), according to an embedment.

The embodiments herein and the various features and advantageous details thereof are explained more fully with reference to the accompanying drawings and detailed in the following description. Descriptions of well-known components and processing techniques are omitted to avoid unnecessarily obscuring the embodiments herein. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

The embodiments herein provide methods and systems for ensuring call continuity for an ongoing call of a User Equipment (UE) of a wireless communication system. The UE may initiate at least one action to be taken by the UE upon detection of an event among a plurality of events that may occur during the ongoing call.

In an embodiment, the detected event may correspond to confirmation of time elapsed from a last received acknowledgement message from a serving Radio Network Controller (RNC) exceeds a first predefined time duration. Upon detection of the event, the UE may follow steps corresponding to the detected event to maintain call continuity. Thus, whenever the UE experiences Uplink (UL)/Downlink (DL) Failures, the UE may perform actions to reduce call drop rate and improve call continuity by, for example, performing faster recovery from a RLF or a Radio Link Control (RLC) unrecoverable error.

In an embodiment, the detected event may correspond to reception of a Radio Resource Control (RRC) connection release message with a cause as Directed Signaling Connection Re-establishment (DSCR) from a drift RNC. Upon detection of the event, the UE may follow steps corresponding to the detected event to maintain call continuity.

In an embodiment, the detected event may correspond to confirmation of not receiving response from the drift RNC after the UE carries out a maximum allowed quantity of cell update attempts for re-establishing the ongoing call. Upon detection of the event, the UE may follow steps corresponding to the detected event to maintain call continuity.

Thus, whenever the UE requires cell reselection for re-establishing the call, the UE may implement improvised cell selection for re-establishing the call by avoiding unexpected connection release.

The ongoing call may be a circuit Switched (CS) call or a Packet Switched (PS) call. The behavior defined for the UE corresponding to each of the stated events may enable a reduced call drop rate and enhance user experience.

In an embodiment, the UE may be a mobile phone, a smart phone, a laptop, a palmtop, a computer, a wearable computing device, a tablet or any device with PS/CS call capability.

The embodiments will now be described with reference to the drawings, and more particularly to FIGS. 1 through 6, in which similar reference characters denote corresponding features consistently throughout the drawings.

FIG. 1 illustrates a wireless communication system for providing call continuity for an ongoing call of a UE, according to an embodiment.

As depicted in the FIG. 1, the wireless communication system includes a core network 110 and a Universal Terrestrial Radio Access Network (UTRAN) 108. The UTRAN 108 may include a plurality of RNCs such as RNC 106a and RNC 106b, each RNC controlling communication for UEs 102a, 102b, and 102c within coverage area of evolved NodeBs (eNBs), such as eNB 104a and eNB 104b, under the control of a corresponding RNC. In the embodiment, the UE 102a is currently being served by a cell of a RNC 106a through eNB 104a, hence forth referred as serving RNC. The RNC 106b, here referred as drift RNC, may control communications for the UE 102a, if after a cell update the UE 102a selects a cell of RNC 106b (for example, cell corresponding to eNB 104c).

In a current situation, the UE 102a is engaged with ongoing call when served by the eNB 104a of the serving RNC. During the ongoing call, the UE 102a can be configured to detect an event among a plurality of events that may occur during the ongoing call and perform at least one action based on the detected event.

In one scenario, the event may correspond to confirming by the UE 102a that a time elapsed from the last received acknowledgement message from the serving RNC exceeds a first predefined time duration.

The first predefined time may be defined as a time corresponding to a maximum of a second time duration and a third time duration. The second time duration may correspond to summation of time duration for satisfying a RLF condition and time duration of a RLF timer. The third time duration may correspond to product of a poll timer value and a maximum Protocol Data Unit (PDU) retransmission count of the UE 102a.

Upon detection of the event, the UE 102a may be configured to initiate Radio Link Failure (RLF) procedures for the UE. This earlier triggers RLF procedures at the UE as compared to the UE behavior defined in current 3GPP specifications. Effectively, this reduces possibility of reception of an RRC connection release message from the serving RNC before declaration of the RLF. This enables the UE 102a to quickly trigger a cell update procedure to re-establish the ongoing call and reduces the possibility of call dropping.

In another scenario, whenever the UE 102a successfully satisfies the RLF conditions such RLF or RLC unrecoverable error, declares the RLF, and triggers cell update procedure for re-establishing the call, the cell selected may belong to an RNC (here, drift RNC) different than the serving RNC. In such situations, the UE 102a may be configured to behave as proposed for maintaining call continuity. Thus, when the UE 102a is performing the cell update with the cell of the drift RNC and the detected event corresponds to reception from the drift RNC of the RRC connection release message with a cause as the DSCR, then the UE 102a may be configured to ignore the received RRC connection release message with the DSCR, reselect a cell (such as cell corresponding to eNB 104c) of the serving RNC and retry the cell update procedure. This effectively reduces possibility of a call drop.

In yet another scenario, the UE 102a is performing the cell update after selecting the cell of the drift RNC. If the detected event corresponds to confirmation of not receiving response from the drift RNC after the UE 102a carries out a maximum quantity of allowed cell update attempts for re-establishing the ongoing call, then the UE 102a may be configured to reselect the cell of the serving RNC and retry the cell update procedure. However, the UE 102a may be configured to perform the cell reselection only if a Circuit Switched (CS) domain re-establishment timer of the UE is running, when the event is detected by the UE.

Figure 2:
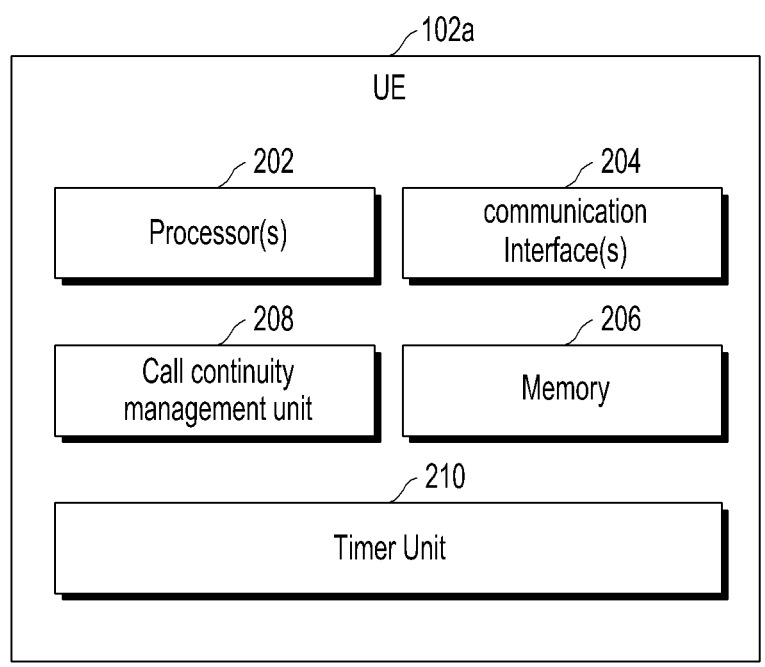
FIG. 2 illustrates a block diagram of a UE, according to an embodiment.

FIG. 2 illustrates a block diagram of a UE, according to an embodiment.

Referring to FIG. 2, the UE 102a is illustrated. The UE 102a may include a processor(s) 202, a communication interface(s) 204, and a memory 206. The communication interface(s) may include an antenna and hardware or software configured to communicate according to one or more communication standards (e.g., 3GPP, 4G, LTE, etc.) and allow the UE 102a to communicate with other entities such as with the RNCs and core network 110 through eNBs using cellular networks with different Radio Access Technologies (RATs). Further, the UE 102a may communicate with other UEs through Wi-Fi networks, device to device communication and the like via communication interface 204 including one or more wireless communication interfaces (e.g., WiFi, Bluetooth, etc.). The memory 206 may store data generated by the processor 202 during execution of a plurality of processes for device functions of the UE 102a. Further, the UE 102a comprises a call continuity management unit 208 and a timer unit 210. Whenever the UE is engaged with the ongoing call as explained in conjunction with wireless communication system depicted in FIG. 1, the call continuity management unit 208 may be configured to detect the event from the plurality of events that may occur during the ongoing call and perform at least one action upon occurrence of the detected event.

According to an embodiment, the event may include detecting whether time elapsed from the last received acknowledgement message from the RNC 106a exceeds the first predefined time duration. The first predefined time may correspond to a maximum of the second time duration and the third time duration monitored by the timer unit 210, which may include one or more locations stored in addressable memory or one or more counters or registers. The second time duration may correspond to summation of time duration for satisfying the RLF condition and time duration of the RLF timer of the UE 102a. The third time duration may correspond to a product of the poll timer value and the maximum PDU retransmission count of the UE 102a. Upon detection of the event, the call continuity management unit 208 may be configured to initiate RLF procedures for the UE 102a. This triggers early RLF procedures at the UE as compared to the UE behavior defined in current 3GPP specifications and reduces chances of a call drop, further explained in conjunction with an example sequence diagram of FIG. 4.

According to an embodiment, the event may include detecting whether the RRC connection release message with the cause DSCR is received from the drift RNC after the UE 102a initiates cell update procedure on the cell of the drift RNC. Upon detection of the event, the call continuity management unit 208 may be configured to ignore the received RRC connection release message with the DSCR, reselect the cell of the serving RNC, and retry the cell update procedure. The scenario is explained in conjunction with an example sequence diagram of FIG. 5.

According to an embodiment, the event may include detecting whether there is no reception of response from the drift RNC after the UE 102a carries out a maximum quantity of allowed cell update attempts for re-establishing the ongoing call on the cell of the drift RNC. Upon detection of the event, the call continuity management unit 208 may be configured to reselect the cell of the serving RNC and retry the cell update procedure. This reattempt is possible if the CS domain re-establishment timer of the UE 102a is running. The scenario is explained in conjunction with an example sequence diagram of FIG. 6.

Thus, the UE behavior requires changes to the existing 3GPP standard and no changes are required to other entities (e.g., RNCs) of the wireless communication system. The proposed UE behavior provides better CS call sustainability under suboptimal signal environment, and in which RLF is detected using Layer 2 (L2) parameters also, rather than depending only on the usual Layer 1 (L1) parameters as described by the second time duration and the third time duration. Further, the UE behavior ensures avoiding delay in RLF scenarios in which the RNC releases the connection before the UE communicates with the RNC for RLF. Further, the proposed UE behavior reduces CS call drops and lesser PS re-establishment time during DSCR scenarios. Further, the proposed UE behavior provides better utilization of call re-establishment timer periods for re-connecting with the network.

Figure 3:
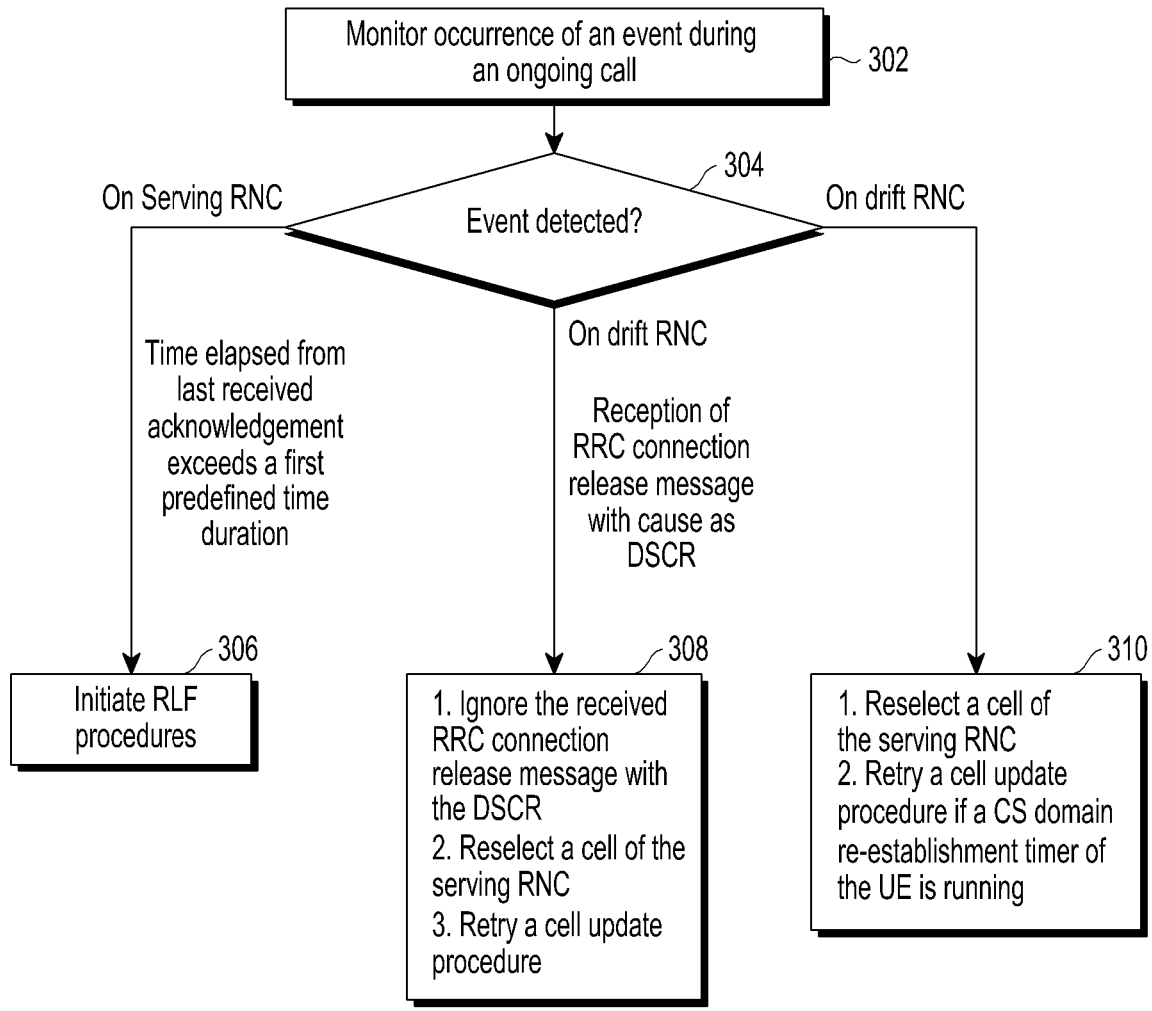
FIG. 3 illustrates a flowchart of a method for providing call continuity, according to an embodiment.

FIG. 3 illustrates a flowchart of a method for providing call continuity, according to an embodiment. Whenever the UE 102a is engaged with the ongoing call as explained in conjunction with wireless communication system depicted in FIG. 1 then, at step 302, the UE 102a may monitor occurrence of the event from among the plurality of events that may occur during the ongoing call and perform at least one action based on the detected event.

At step 304, the UE determines that an event occurs. The UE may determine that one or more events occur.

If the event corresponds to time elapsed from the last received acknowledgement message from the RNC 106a exceeding the first predefined time duration then, at step 306, the UE 102a may initiate RLF procedures. The first predefined time may correspond to a maximum of the second time duration and the third time duration, each of which may be monitored by the timer unit 210. The second time duration may correspond to summation of time duration for satisfying the RLF condition and time duration of the RLF timer of the UE 102a. The third time duration may correspond to product of the poll timer value and the maximum PDU retransmission count of the UE 102a. This event detection triggers early RLF procedures at the UE as compared to the UE behavior defined in current 3GPP specifications and reduces chances of call drop, further explained in conjunction with an example sequence diagram of FIG. 4.

If at step 304, the event corresponds to reception of the RRC connection release message with the cause DSCR from the drift RNC then, at step 308, the UE 102a may ignore the received RRC connection release message with the DSCR, reselect the cell of the serving RNC, and retry the cell update procedure. The scenario is explained in conjunction with an example sequence diagram of FIG. 5.

If at step 304, the event corresponds to no reception of response from the drift RNC after the UE 102a carries out a maximum quantity of allowed cell update attempts for re-establishing the ongoing call then, at step 310, the UE 102a may reselect the cell of the serving RNC and retry the cell update procedure. This reattempt is possible if the CS domain re-establishment timer of the UE 102a is running. The scenario is explained in conjunction with an example sequence diagram of FIG. 6.

The various actions in method may be performed in the order presented, in a different order or simultaneously. Further, in some embodiments, some actions listed in FIG. 3 may be omitted.

Figure 4:
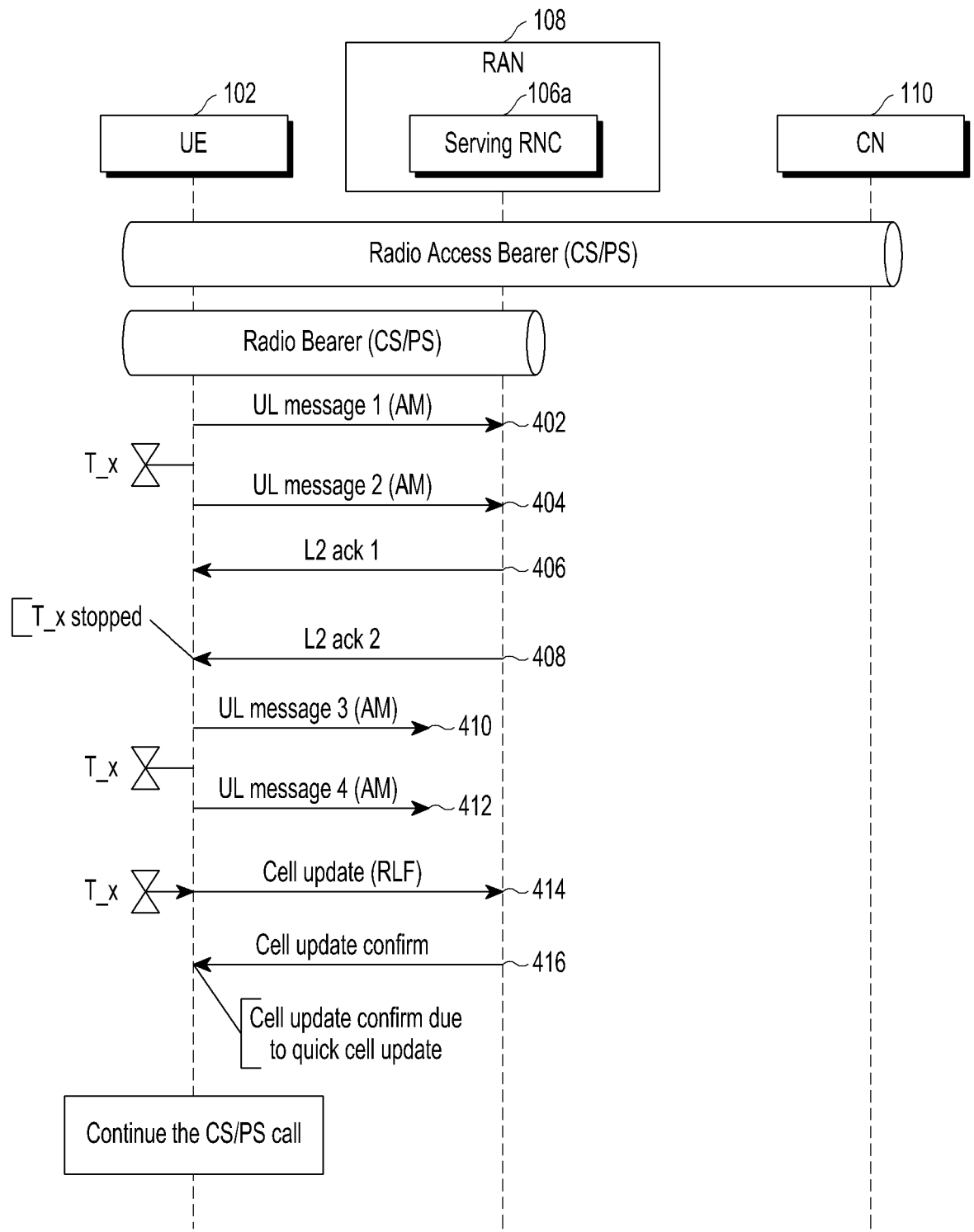
FIG. 4 illustrates a diagram of maintaining call continuity, according to an embodiment.

FIG. 4 illustrates a diagram of maintaining call continuity, according to an embodiment.

In FIG. 4, the UE 102a is engaged with the ongoing call such as the CS or the PS call. A Radio Access Bearer (RAB) between the UE 102a and the core network 110, and a Radio Bearer (RB) between the UE 102a and the serving RNC in the UTRAN 108, is established for the ongoing call. Whenever UE 102a begins transmission on a UL channel, a timer is set by the timer unit 210 for monitoring and confirming that the time elapsed from the last received acknowledgement message from the serving RNC exceeds the first predefined time duration. Thus, a timer T_x is initiated as after transmitting the first UL message 1 (402). Further, the UE 102a continues UL transmissions (404). The timer is stopped once all acknowledgements for the transmitted messages are received from the serving RNC. The timer expires if any acknowledgement of the transmitted UL messages is not received for the defined duration.

Figure 5:
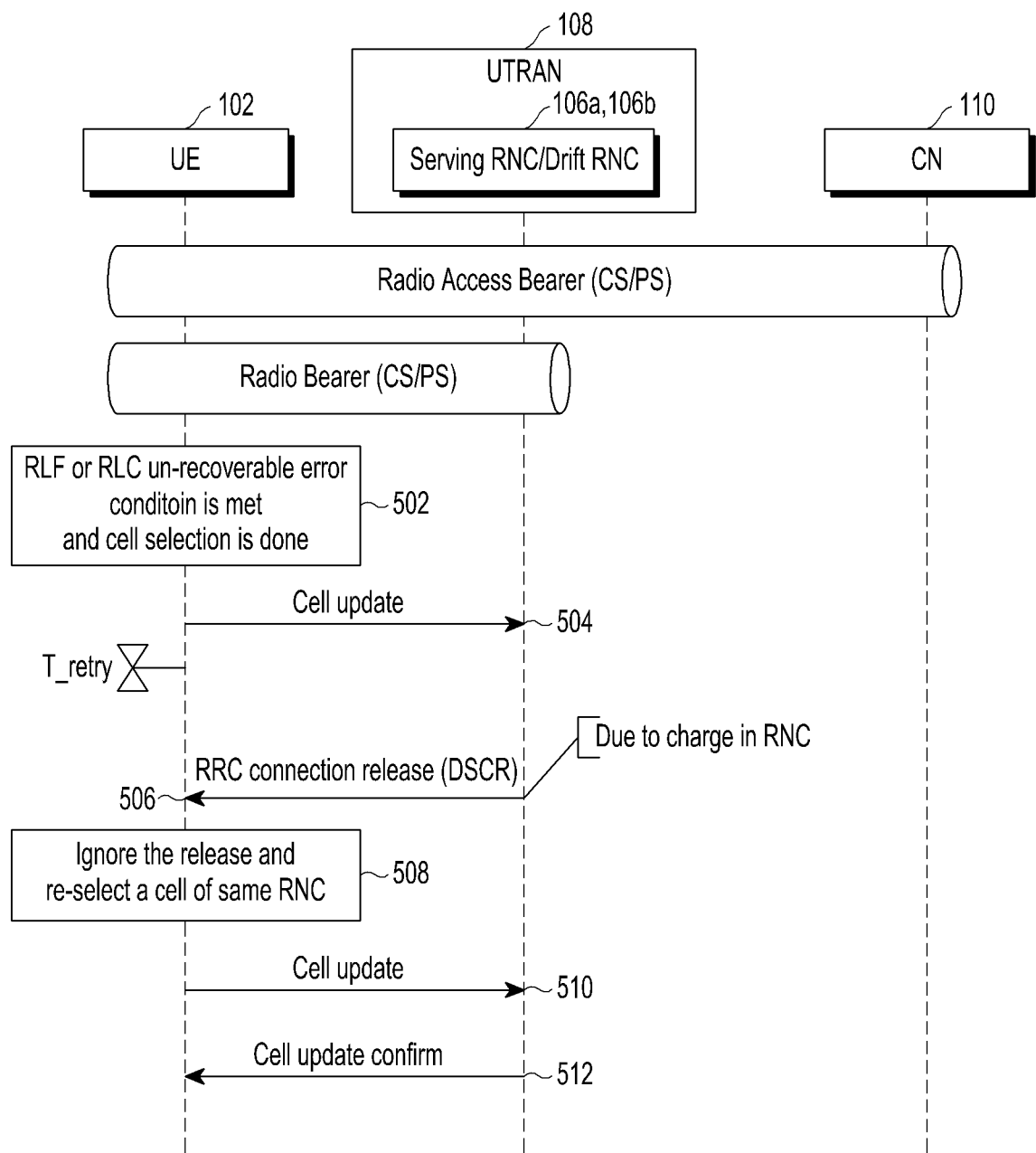
FIG. 5 illustrates a diagram of maintaining call continuity, according to an embodiment.

FIG. 5 illustrates a diagram of maintaining call continuity, according to an embodiment.

The RAB between the UE 102a and the core network 110, and the RB between the UE 102a and the serving RNC in the UTRAN 108, is established for the ongoing call. Whenever the UE 102a successfully meets the RLF conditions or the RLC unrecoverable conditions (502), the UE 102a may initiate cell update procedure (504) for reestablishing the call on the cell of the drift RNC as depicted. However, when the UE 102a receives the RRC connection release with the cause as DSCR (506) from the drift RNC, the UE 102a may be configured to ignore (508) the release instruction and reselect to the cell of the serving RNC. Thus, the UE 102a reinitiates the cell update (510) on the cell of the serving RNC and receives a cell update confirm (512) message, thus maintains the call continuity.

Figure 6:
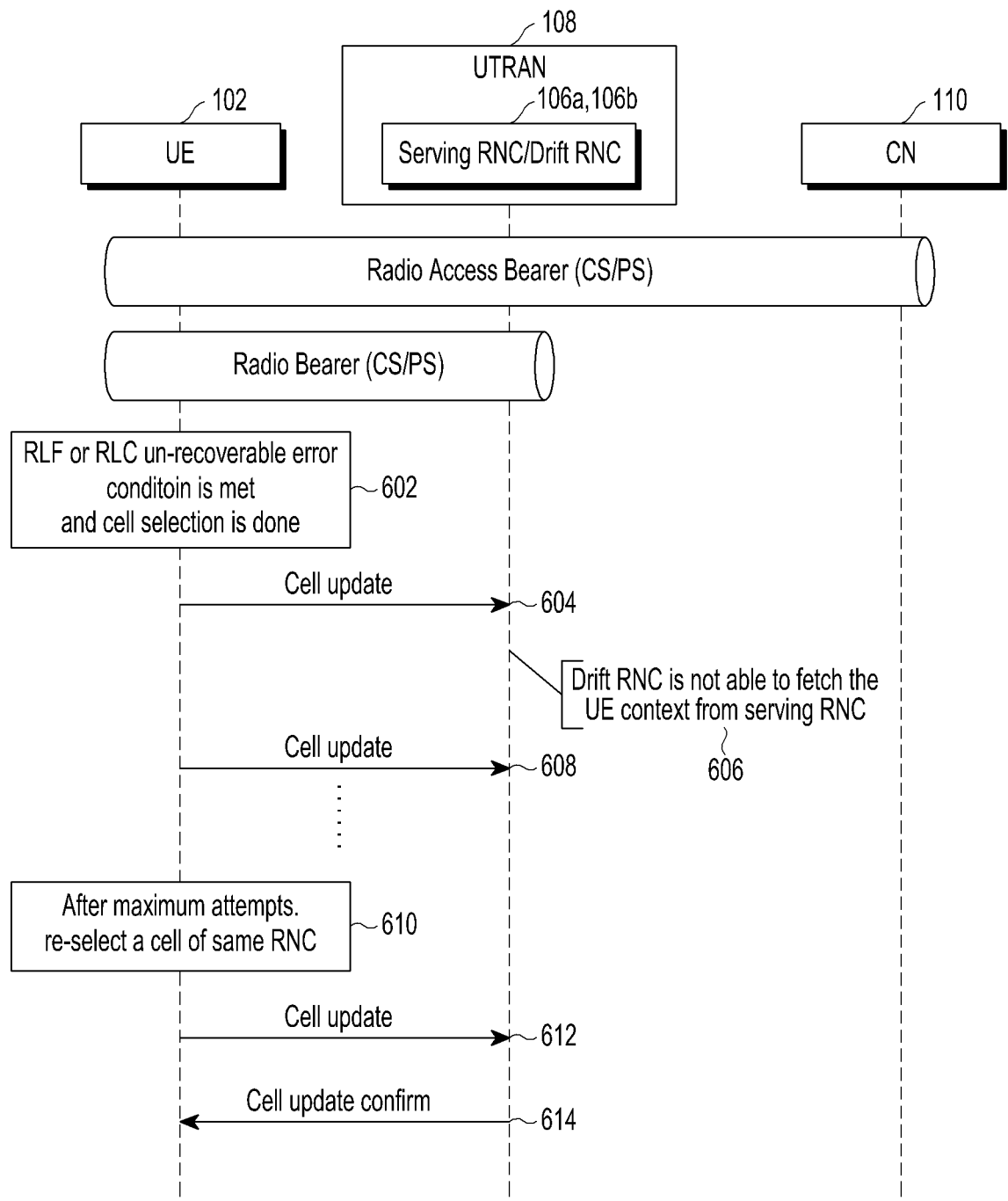
FIG. 6 illustrates a diagram of maintaining call continuity, according to an embodiment.

FIG. 6 illustrates a diagram of maintaining call continuity, according to an embodiment.

The RAB between the UE 102a and the core network 110, and the RB between the UE 102a and the serving RNC in the UTRAN 108, is established for the ongoing call. Whenever the UE 102a successfully meets the RLF conditions or the RLC unrecoverable conditions (602), the UE 102a initiates cell update procedure (604) for reestablishing the call on the cell of the drift RNC, as depicted. However, if the drift RNC is unable to fetch the UE 102a context from the serving RNC (606), the UE 102a experiences an unsuccessful cell update even after maximum allowed cell update attempts (608). In such situations the UE 102a can be configured to reselect (610) the cell of the serving RNC. Thus, the UE 102a reinitiates the cell update (612) on the cell of the serving RNC and may receive a cell update confirm (614) message, thus maintaining the call continuity. However, the UE may be configured to reselect the cell if the CS domain re-establishment timer of the UE 102a is running.

The embodiments disclosed herein may be implemented through at least one software program stored in memory running on at least one hardware device (e.g., processor, microprocessor, CPU, etc.) and performing network management functions to control the network elements. The network elements, shown in FIG. 1 through FIG. 6, include blocks which may be at least one of a hardware device, or a combination of hardware device and software module.

The foregoing description of the embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method of a user equipment providing call continuity in a wireless communication system, the method comprising:
    detecting, by the user equipment, an occurrence of an event during a call, wherein the event comprises one of:
        a reception of a radio resource control connection release message with a cause as directed signaling connection re-establishment from a drift radio network controller, or
        lack of a reception of response from the drift radio network controller after the user equipment carries out a maximum quantity of allowed cell update attempts for re-establishing the call; and
    performing at least one action in response to detecting the occurrence of the event.

2. The method as claimed in claim 1, wherein the event is the time elapsed from the last received acknowledgement message from the serving radio network controller exceeds the first time duration, and
    wherein the at least one action comprises initiating radio link failure procedures.

3. The method as claimed in claim 2, wherein the first time duration is equal to a maximum of a second time duration and a third time duration,
    wherein the second time duration corresponds to summation of a time duration for satisfying a radio link failure condition and a time duration of a radio link failure timer, and
    wherein the third time duration corresponds to a product of a poll timer value and a maximum protocol data unit retransmission count.

4. The method as claimed in claim 1, wherein the event is the reception of the radio resource control connection release message with the cause as the directed signaling connection re-establishment from the drift radio network controller, and
    wherein the at least one action comprises:
        reselecting a cell of the serving radio network controller; and
        retrying a cell update procedure.

5. The method as claimed in claim 1, wherein the event is the lack of the reception of response from the drift radio network controller after the user equipment carries out the maximum quantity of allowed cell update attempts for re-establishing the call, and
    wherein the at least one action comprises:
        reselecting a cell of the serving radio network controller; and
        retrying a cell update procedure based on a circuit switched domain re-establishment timer being running.

6. The method as claimed in claim 1, wherein the call is a circuit-switched call or a packet-switched call.

7. A user equipment for providing call continuity in a wireless communication system, wherein the user equipment comprising:
    a memory configured to store computer-readable instructions for providing the call continuity during a call; and
    at least one processor, which when executing the computer-readable instructions, configured to:
        detect an occurrence of an event during the call, wherein the event comprises one of:
            a reception of a radio resource control connection release message with a cause as directed signaling connection re-establishment from a drift radio network controller, or
            lack of a reception of response from the drift radio network controller after the user equipment carries out a maximum quantity of allowed cell update attempts for re-establishing the call; and
        perform at least one action in response to detecting the occurrence of the event.

8. The user equipment as claimed in claim 7, wherein the event is the time elapsed from the last received acknowledgement message from the serving radio network controller exceeds the first time duration, and
    wherein the at least one action comprises initiating radio link failure procedures.

9. The user equipment as claimed in claim 8, wherein the first time duration is equal to a maximum of a second time duration and a third time duration,
    wherein the second time duration corresponds to summation of a time duration for satisfying a radio link failure condition and a time duration of a radio link failure timer, and
    wherein the third time duration corresponds to a product of the a poll timer value and a maximum protocol data unit retransmission count.

10. The user equipment as claimed in claim 7, wherein the event is the reception of the radio resource control connection release message with the cause as the directed signaling connection re-establishment from the drift radio network controller, and
    wherein the at least one action comprises:
        reselecting a cell of the serving radio network controller; and
        retrying a cell update procedure.

11. The user equipment as claimed in claim 7, wherein the event is the lack of the reception of response from the drift radio network controller after the user equipment carries out the maximum quantity of allowed cell update attempts for re-establishing the call, and
    wherein the at least one action comprises:
        reselecting a cell of the serving radio network controller; and
        retrying a cell update procedure based on a circuit switched domain re-establishment timer being running.

12. The user equipment as claimed in claim 7, wherein the call is a circuit-switched call or a packet-switched call.

13. A mobile device comprising:
    a memory configured to store computer-readable instructions; and
    at least one processor configured to execute the computer-readable instructions, which when executed cause the at least one processor to implement a method of maintaining call continuity during a call while the mobile device travels through one or more areas serviced by a wireless network, the method comprising:
        (a1) detecting that a time elapsed from receipt of a last received acknowledgement message from a serving radio network controller of the wireless network to which the mobile device is connected during the call exceeds a first time duration, and
        (a2) initiating radio link failure procedure prior to a reception of a radio resource control connection release message from the serving radio network controller, in response to detecting that the time elapsed from the receipt of the last received acknowledgement message from the serving radio network controller of the wireless network to which the mobile device is connected exceeds the first time duration;

(b1) detecting the reception of the radio resource control connection release message from a drift radio network controller indicating a cause of the radio resource control connection release message as directed signaling connection re-establishment, and
(b2) reselecting a cell of the serving radio network controller and retrying a cell update to re-establish the call, in response to detecting the reception of the radio resource control connection release message from the drift radio network controller indicating the cause of the radio resource control connection release message as directed signaling connection re-establishment; and
(c1) detecting an absence of confirmation from the drift radio network controller of a maximum quantity of allowed cell update attempts for re-establishing the call, and
(c2) reselecting the cell of the serving radio network controller and retrying the cell update to re-establish the call based on a circuit switched domain re-establishment timer being running, in response to detecting the absence of confirmation from the drift radio network controller of the maximum quantity of allowed cell update attempts for re-establishing the call.

14. The mobile device as claimed in claim 13, wherein the first time duration is equal to a maximum of a second time duration and a third time duration,
wherein the second time duration corresponds to summation of a time duration for satisfying a radio link failure condition and a time duration of a radio link failure timer, and
wherein the third time duration corresponds to a product of the a poll timer value and a maximum protocol data unit retransmission count.

15. The mobile device as claimed in claim 13, further comprising an antenna,
wherein the at least one processor is configured to control the mobile device to communicate with the serving radio network controller and the drift radio network controller via transmitting signals to the serving radio network controller and the drift radio network controller through the antenna and receiving signals from the serving radio network controller and the drift radio network controller through the antenna.

16. The mobile device as claimed in claim 15, wherein the call is a circuit-switched call or a packet-switched call.

17. The mobile device as claimed in claim 16, wherein the mobile device is configured to be connected to a core network of the wireless network via the serving radio network controller or the drift radio network controller and at least one base station connected to the serving radio network controller or the drift radio network controller.

18. The mobile device as claimed in claim 17, wherein the mobile device is configured to implement third generation partnership project.

19. The mobile device as claimed in claim 17, wherein the mobile device is configured to implement universal terrestrial radio access network.

* * * * *